US011983225B1

(12) United States Patent
Connery et al.

(10) Patent No.: US 11,983,225 B1
(45) Date of Patent: May 14, 2024

(54) METHOD INVOLVING REAL-TIME CONFIDENTIAL ELECTRONIC MATCHING FOR FORMING ANONYMOUS CONNECTIONS AT LIVE EVENTS

(71) Applicants: Jason T Connery, Calgary (CA); Jennifer Audrey Hardie-Connery, Calgary (CA)

(72) Inventors: Jason T Connery, Calgary (CA); Jennifer Audrey Hardie-Connery, Calgary (CA)

(*) Notice: Subject to any disclaimer, the term of this patent is extended or adjusted under 35 U.S.C. 154(b) by 0 days.

(21) Appl. No.: 16/276,427

(22) Filed: Feb. 14, 2019

Related U.S. Application Data (60) Provisional application No. 62/630,831, filed on Feb. 15, 2018.

(51) Int. Cl.
*G06F 16/906* (2019.01)
*G06F 16/9035* (2019.01)
*G06F 21/62* (2013.01)
*G06Q 50/00* (2012.01)

(52) U.S. Cl.
CPC ........ *G06F 16/906* (2019.01); *G06F 16/9035* (2019.01); *G06F 21/6254* (2013.01); *G06Q 50/01* (2013.01)

(58) Field of Classification Search
CPC .............. G06F 16/906; G06F 16/9035; G06F 21/6254; G06Q 50/01
USPC .......................................................... 707/737
See application file for complete search history.

(56) References Cited

U.S. PATENT DOCUMENTS

| 5,136,501 A | 8/1992 | Silverman et al. |
| 5,659,731 A | 8/1997 | Gustafson |
| 5,884,272 A | 3/1999 | Walker et al. |
| 5,920,845 A | 7/1999 | Risemberg |
| 5,950,200 A | 9/1999 | Sudai |
| 6,052,122 A | 4/2000 | Sutcliffe et al. |
| 7,203,674 B2 | 4/2007 | Cohen |

(Continued)

FOREIGN PATENT DOCUMENTS

| WO | WO 01/37232 A1 * | 5/2001 | ............... G08B 1/08 |
| WO | WO 2015/142292 A1 * | 9/2015 | ............. G06Q 50/00 |

OTHER PUBLICATIONS

"Minimum cut", Wikipedia, downloaded from: https://en.wikipedia.org/wiki/Minimum_cut, downloaded on Mar. 16, 2022, pp. 1-2.*

(Continued)

*Primary Examiner* — Robert Stevens (57) ABSTRACT

A system that applies real-time electronic matching of a plurality of users in a live event, to enable the formation of anonymous connections amongst groups of users who can then interact through social activities. An event features a plurality of rounds, and in each round, users are matched into groups based on user selected interests. The matching system employs a user-enabled confidential selection of interests, through the use of, but not limited to, a personal device, such as a mobile phone or computer. The present invention is not limited in application to social networking environments, such as in a singles' event. It can also be applied in other environments where anonymous interactions are of importance, such as in the matching of potential buyers or sellers of products and services; or in the matching of recruiters and employment candidates.

5 Claims, 9 Drawing Sheets

(56) References Cited

U.S. PATENT DOCUMENTS

| | | | |
|---|---|---|---|
| 7,305,398 | B2 | 12/2007 | Teicher |
| 7,522,058 | B1 | 4/2009 | Light et al. |
| 7,769,699 | B2 | 8/2010 | Teicher |
| 7,849,212 | B2 | 12/2010 | Teicher |
| 8,014,763 | B2* | 9/2011 | Hymes ............... H04M 1/72403 |
| | | | 455/456.3 |
| 8,219,501 | B2 | 7/2012 | Teicher |
| 8,700,644 | B1* | 4/2014 | Allen ..................... H04L 67/535 |
| | | | 706/45 |
| 9,576,325 | B2* | 2/2017 | Narayanan ......... G06Q 10/1095 |
| 9,934,297 | B2* | 4/2018 | Taylor ..................... H04L 51/04 |
| 2004/0254809 | A1* | 12/2004 | Teicher .................... A63F 13/35 |
| | | | 705/1.1 |
| 2008/0046282 | A1* | 2/2008 | Teicher .................. G06Q 30/02 |
| | | | 705/319 |
| 2008/0098313 | A1* | 4/2008 | Pollack .................. G06Q 10/10 |
| | | | 715/753 |
| 2008/0228875 | A1* | 9/2008 | Cohen ..................... G06Q 50/10 |
| | | | 709/204 |
| 2009/0307610 | A1 | 12/2009 | Ryan |
| 2010/0268656 | A1* | 10/2010 | Teicher ............... G06F 16/9535 |
| | | | 705/319 |
| 2012/0036444 | A1* | 2/2012 | Andersen ............... G06Q 50/01 |
| | | | 715/738 |
| 2014/0222926 | A1* | 8/2014 | Allen ...................... H04L 67/22 |
| | | | 709/204 |
| 2015/0039368 | A1* | 2/2015 | Polyakov ............... G06Q 50/01 |
| | | | 705/7.19 |
| 2015/0067070 | A1* | 3/2015 | Jacques ............. G06Q 30/0269 |
| | | | 709/206 |
| 2017/0093967 | A1* | 3/2017 | Grosz ................ G06Q 30/0605 |
| 2017/0109447 | A1* | 4/2017 | Wu ......................... H04W 4/21 |
| 2017/0109709 | A1* | 4/2017 | Wu ......................... H04W 4/21 |
| 2017/0255907 | A1* | 9/2017 | Page-Romer ...... G06Q 10/1095 |
| 2018/0121828 | A1* | 5/2018 | Keysers ................. G06N 20/00 |
| 2019/0019217 | A1* | 1/2019 | Bhowmick ............ G06Q 30/02 |

OTHER PUBLICATIONS

"ECrush—who loves ya, baby?", screenshot of www.ecrush.com, Dec. 10, 2007, cited in U.S. Appl. No. 14/589,995, 1 page.*

"What is the difference between a date party and a crush party in a sorority?", GreekChat.com—The Fraternity & Sorority Greek Chat Network, last posted reply dated Oct. 6, 2007, pp. 1-5.*

"Speed dating", Wikipedia, downloaded from: https://en.wikipedia.org/wiki/Speed_dating, May 2, 2023, pp. 1-7.*

* cited by examiner

METHOD INVOLVING REAL-TIME CONFIDENTIAL ELECTRONIC MATCHING FOR FORMING ANONYMOUS CONNECTIONS AT LIVE EVENTS

CROSS-REFERENCE TO RELATED APPLICATIONS

The present application claims the benefit of U.S. provisional patent application Ser. No. 62/630,831, titled "SYSTEM INVOLVING REAL-TIME CONFIDENTIAL ELECTRONIC MATCHMAKING FOR FORMING ANONYMOUS CONNECTIONS AT LIVE EVENTS," filed Feb. 14, 2018, which is incorporated by reference herein in its entirety.

BACKGROUND

This specification relates generally to systems and methods for socially matching people, and more specifically to systems and methods for electronic confidential matching of people, including singles, at live events.

There are many products and services aimed at matching singles with the intent of forming successful romantic relationships and connections. These products and services may be offered online only; offline only; or both online and offline.

Online-only matching services have been prominent since the early days of the internet era and offer websites that allow singles to join as members for free or as a paid service. Any offline interactions between members are usually organized by members. Recent adaptations of the online-only type of services have included mobile applications that allow members to reveal their interests in other members within the database and independently arrange for one-on-one offline social interactions. Given that interactions between singles are limited to only the online environment to start with, singles who discover chemistry online with another member are usually attracted to the other based on limited and unverified data such as photos, profile text, and initial messaging.

Offline-only matching services provide activities that happen primarily offline. Speed dating and matchmaking services are examples of primarily offline-types of matching services. Most speed dating services do not allow members to view the profiles of other members prior to a live event. Members simply register to attend a speed dating event, usually in-person, and sit through a regulated "interview"-styled session with each member of the opposite gender for a designated time. Such speed dating events are intended to help participants get to know others in order to discover chemistry in person. Mutually-interested participants will then exchange contact information for further follow-up.

Matchmaking services generally provide offline-only matching services as well. Members indicate their personal wish list to the service provider in a relationship partner to facilitate matching. Members are usually brought together for one-on-one or group-based social activities, driven by common attributes, such as age, common interests, types of professions, or religious beliefs, in the hopes of generating successful relationships. Offline-only matching services range from upper scale one-on-one customized matching, to generalized group-based matching. The type of social activities organized for singles varies and may include small- or large-scale mixers, sports, board games, meals, travels, etc.

The online to offline space is less common. Some online-only matching services have only recently started offering members opportunities for offline social interactions in the hopes of achieving greater success in forming connections between members. Some singles services offer members the opportunity to attend live small- and/or large-scale events where singles get to mingle and interact with one another.

There are also many non-profit social networking sites, not necessarily targeting singles, which offer online to offline opportunities for members to connect.

In all the above three types of singles matching services, there are service offerings targeted to different demographic and special interest groups, differentiated by attributes such as age, gender types, ethnicity, sexual orientation, marital status, religious beliefs, professions, and interests, to name some examples.

Most singles matching services have one common goal—which is to help singles find connections with a potential relationship partner. From a single person's perspective, each type of singles matching service has its own drawbacks in achieving this goal.

While an online-type of matching service offers many profiles of singles to choose from, the following challenges remain:
  Physically attractive members tend to get noticed more often, and may receive unwanted attention. Conversely, members who are not physically attractive usually have a harder time gaining initial interest from other members, resulting in a lower chance of even getting an offline date;
  Profiles usually contain limited information about whom the person behind it really is, making it hard to know if there will be chemistry in person;
  Not knowing if a profile is genuine given that profiles may be used to "market" oneself by inflating or even faking strengths, and downplaying or hiding flaws;
  Sifting through thousands of profiles can be time-consuming, particularly if members do not know if the other party has a similar objective for the relationship;
  Research has shown that sometimes too many choices in itself may not be a good thing because singles end up waiting for someone else "better" even when they meet a potential partner;
  Can waste a lot of time messaging with someone before knowing if chemistry will exist when meeting them in person;
  Having personal data such as photos and other profile information exposed to the public for anyone to see or use;
  Some online dating sites give the impression of many potential matches but the actual numbers are much lower due to factors such as expired/non-active accounts, non-subscribers unable to message back, changes in relationship status, etc.;
  If the person of interest is not in the same locale, the distance may pose a challenge in getting to know him/her.

An offline-only type of matching service allows singles an opportunity to get to discover if there is chemistry through organized social activities. However, a single member may face the following challenges:
  Small- or large-scale mixers can be awkward and difficult for members who are shy or introverted, particularly if they find themselves needing to approach and initiate conversation with someone interesting which may become even more difficult if that person is also in the company of a group of friends;

Sharing common interests or beliefs only does not necessarily guarantee that members will find chemistry in-person;

Speed dating events can be laborious and awkward, with singles being forced to sit through one-on-one interviews with every person at the event even if no immediate attraction to anyone was found;

Speed dating events tend to have a limited number of attendees that can be accommodated per event, therefore narrowing the chances of meeting someone of mutual interest.

The drawbacks of existing online to offline matching services are similar to online-only and offline-only matching services, including:

Many of the offline activities are small- or large-scale mixers, which require more introverted members to take the initiative to introduce themselves, making it awkward;

Bringing members together based on shared common attributes does not guarantee chemistry in-person if the social activities do not allow for the appropriate amount of interaction;

Physically-attractive members tend to get more attention than those who are less physically-attractive;

Members may find it awkward and difficult to ward off unwelcome attention or feel pressured to respond.

For a single person who is genuinely interested in meeting other singles for the potential of forming a romantic relationship, there is a need for the following:

The ability to get to know someone of interest in-person;

The ability to meet other singles without any pressure or awkwardness;

For someone who may be less physically attractive, the ability to show others the "inner beauty" of their personality;

The ability to meet as many singles as possible within a safe environment, and be able to "test" if there is chemistry without the fear of being rejected, obligated, or pressured.

SUMMARY

In accordance with the foregoing objectives and others, exemplary methods and systems are disclosed herein that apply real-time electronic confidential matching of a plurality of users at a live event to enable the formation of smaller groups of users who are anonymously connected based on user-selected interests, who can then interact through social activities. At the live event, each user selects other users they are interested in meeting through the use of, but not limited to, a personal device, such as a mobile phone, computer, or Google glasses. In an embodiment, users can also select attributes, such as beliefs, hobbies, profession(s), preferred activities, etc. After this selection is finished, the users are divided into small groups, using one or more algorithms, e.g., clustering techniques, etc. For example, a plurality of random sets of groups may be generated, and the best set of groups selected based on a score calculated for each set of groups. In one embodiment, after a set of groups is selected, it is presented to an admin for possible further customization.

After a round of groups is determined, the users are notified of their group assignment, and they participate in a group activity. After the activity, they may update their interests. A new set of groups is then determined, and the process repeats until the event is finished. Afterwards, each user may review the other users with whom they interacted at the event, and the system may send notifications to users that have a mutual interest in each other. In one embodiment of this invention, users may be able to message one another within the system for a designated period of time after the live event ends, thus continuing the social experience.

A preferred embodiment of the present invention is for this system to be applied in social networking environments, such as in a singles' event, as described in this application. However, other embodiments of the present invention may be applied in other environments where anonymous interactions are advantageous, such as in the matching of potential buyers or sellers of products and services; in the matching of potential recruiters and employment candidates; or in networking environments to match people based on defined attributes and/or preferences such as enabling interactions among attendees of conferences and exhibitions.

In one embodiment, the present disclosure is directed to a method for real-time electronic matching of a plurality of users in a live event, the method comprising: receiving interest information regarding a plurality of users; receiving group parameter information, wherein the group parameter information includes group size information; generating a first set of groups of users based on the interest information and the group parameter information, wherein each user is assigned to a single group and each group is approximately the same size; sending a notification to each user, wherein the notification comprises information about the group the user has been assigned to; and generating a second set of groups of users based on the interest information, the group parameter information, and the first set of groups of users, wherein each user is assigned to a single group.

In another embodiment, the present disclosure is directed to a computer program product encoded on one or more non-transitory computer storage media, the computer program product comprising instructions that when executed by one or more processing means cause the one or more processing means to perform operations comprising: receiving interest information regarding a plurality of users; receiving group parameter information, wherein the group parameter information includes group size information; generating a first set of groups of users based on the interest information and the group parameter information, wherein each user is assigned to a single group and each group is approximately the same size; sending a notification to each user, wherein the notification comprises information about the group the user has been assigned to; and generating a second set of groups of users based on the interest information, the group parameter information, and the first set of groups of users, wherein each user is assigned to a single group.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION

The terminology used herein is for the purpose of describing particular embodiments only and is not intended to be limiting of the invention:

The term "singles" refers to potential customers of the matching service who may be interested in attending posted events.

The terms "users" or "participants" refer to individuals who have signed up for posted events and are in attendance at events where the matching happens.

The terms "admin" and "host" are used interchangeably to refer to the administrator of an event, who oversees and manages the overall success of an event.

The term "interests" and "preferences" are used interchangeably to refer to participants who are added to another's secret guestlist.

The term "attributes" is used to describe characteristics in persons of interest that may be appealing to singles, such as common beliefs, hobbies, professions, preferred activities, etc.

The term "mutual interest" is one type of connection where two participants have indicated interest in each other.

The term "one-way interest" is one type of connection, where a participant has indicated interest in another participant.

The terms "secret" and "anonymous" as used herein are intended to refer to preserving the anonymity between two or more parties.

The term "confidential" used herein to describe the electronic matching system is intended to describe the anonymity of the results of the matching arising from anonymous user-preferences.

The term "event" refers to a gathering of a plurality of users in a designated location. The preferred embodiment of the present invention is a live, physical event. Other embodiments of the present invention may include virtual events.

The term "round" is used to describe each turn of small group connections formed during an event. A single event may consist of one or more rounds depending on the nature of the event, number of participants, and duration of each event and round.

The present invention is not limited to a business-to-consumer business model. The matching service can be offered through alternative business models, such as in the form of a business-to-business model using a software platform which allows third party users, such as businesses, vendors, service providers, entrepreneurs and non-profit community groups, to deliver the present system.

An embodiment of this invention describes events as being live events where users are physically present in a common location. Other embodiments of the present invention may involve applying the system within a virtual environment where users are online at the same time but not physically present in a single location.

The present invention offers opportunities for singles to get to learn more about other singles through offline group social activities. Offline, in-person events address the above drawbacks of existing singles matching services because:

Singles who are serious about meeting people in-person, rather than just staying within the online dating space, would be attracted to the present service. This presents a potentially fertile atmosphere for meeting potential partners;

In-person group events offer a safe environment for singles to interact with other participants and discover if there is chemistry in-person;

All matching happens within the live events, which allows participants to validate if a potential interest is truly a candidate for further connection through small group activities.

The secret guestlist allows event participants to discreetly indicate their interest in fellow participants. This achieves the following:

Anonymity, which allows participants to indicate their interest in other participants and have the opportunity to interact in smaller groups to validate their interest;

Boldness, which allows participants who are shy or introverted to express an interest in getting to know other participants within smaller groups without feeling pressured or awkward;

Discovery, which allows singles who may not have indicated their interest in certain participants for a variety of reasons, such as an initial lack of physical attraction, to connect in smaller groups and get to know one another through social activities. Studies have shown that physical attraction online may not result in chemistry in-person.

The small group activities are beneficial in the following ways:

Events are hosted, which means singles do not find themselves in the awkward situation of having to approach someone and initiate a conversation if they do not feel comfortable doing so. This particularly benefits singles who have introverted personalities and because they do not tend to be the first to initiate contact, they may have limited chances to show others their attractive personalities.

Feeling chemistry with someone online does not necessarily guarantee that there will be chemistry in-person. The nature of the social events included in this system are large-scale with smaller group interactions involving selected participants, allowing singles to discover if there is chemistry with other participants whom they have secretly indicated they are interested in through social interactions.

The "secret" nature of the social events also builds suspense and in some cases, flattery. Each small group consists of participants who are unsure how they are connected to other participants. Studies have shown that people can be attracted to people whom they think are interested in them.

The anonymous environment allows singles to "walk away" from a small group where they do not experience chemistry with other participants, in a pressure-free manner.

Figure 1:
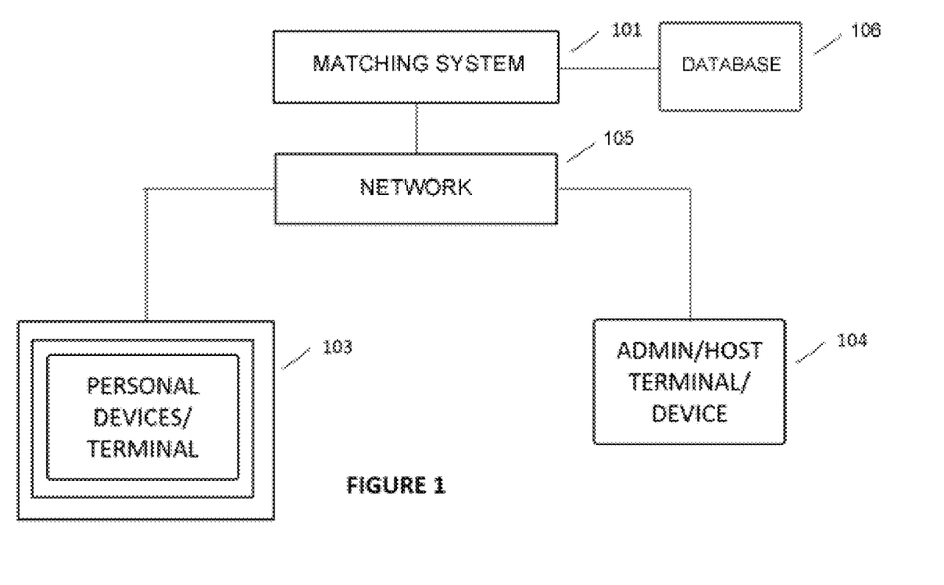
FIG. 1 provides an overview of a system of the present disclosure according to an embodiment.

Referring to FIG. 1, a block diagram of an exemplary system according to the principles of the present disclosure is illustrated. The system may include a matching system 101, user devices 103, and admin devices 104. The user devices, admin devices, and matching system may interact through a communication network 105. Non-limiting examples of communication networks include local area networks (LANs), wide area networks (WANs) (e.g., the Internet), etc.

A user accesses the matching system 101 via a user device 103 connected to the network 105. A user device 103 may be any computer device capable of accessing the matching system 101, such as by running a client application or other software, like a web browser or web-browser-like application. In an embodiment, a user device 103 may be a kiosk terminal or other device at the location of an event.

An admin accesses the matching system 101 via an admin device 104 connected to the network 105. An admin device 103 may be any computer device capable of accessing the matching system 101, such as by running a client application or other software, like a web browser or web-browser-like application. In an embodiment, an admin device 103 may be a kiosk terminal or other device at the location of an event.

The matching system 101 is adapted to receive, determine, record, and/or transmit user information for any number of users. Such information may be manually entered or selected by a user via an online, mobile, or desktop application. The matching system may store received or determined user information in, for example, a database 106.

The matching system is further adapted to receive, determine, record, and/or transmit event information for any number of events. Such information may be manually entered or selected by a user or an admin via an online, mobile, or desktop application on a user device 103 or an admin device 104. The matching system may store received or determined event information in, for example, a database 106.

Each of the user and admin devices 103, 104 may have a client application running thereon, where the client application may be adapted to connect with the matching system 101. The client application may be further adapted to present various user interfaces to users and admins. Such interfaces may be based on information sent by the matching system, and may allow the user and/or admin to send and receive data. Each client application may comprise HTML data, images, videos, icons, and/or executable code. The executable code may be composed in JavaScript, ECMAscript, coffeescript, python, Ruby or any other programming languages suitable for execution within the client application, or translation into a client application executable form.

Figure 7:
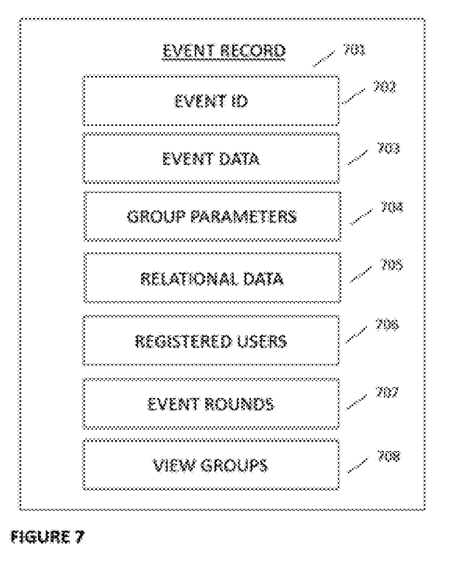
FIG. 7 illustrates an example of the fields in an event record.

The database 106 stores user records and event records, among other data. FIG. 7 provides an example of what an event record 701 may consist of, including but not limited to an event ID 702, event data 703 (e.g., location, start and end time, event description, event code (a code that identifies the event, and may be given to users), event status (future, running, or past), type of event (e.g., speed dating, networking event, mixer, etc.), profile display parameters (e.g., when the user is allowed to access user profiles and for how long), messaging parameters (e.g., when messaging capability between users starts and ends)), group parameters 704 (e.g., number of groups in each round and/or min and max number of users in each group, number of users of each gender in each group), relational data 705 (e.g., data regarding other participants or interests that each user has voted for), a list of registered users 706, event rounds (as they are formed during the event) 707, and one or more queries that display existing data from the database 708, e.g., a list of groups and the users assigned to each group.

Figure 8:
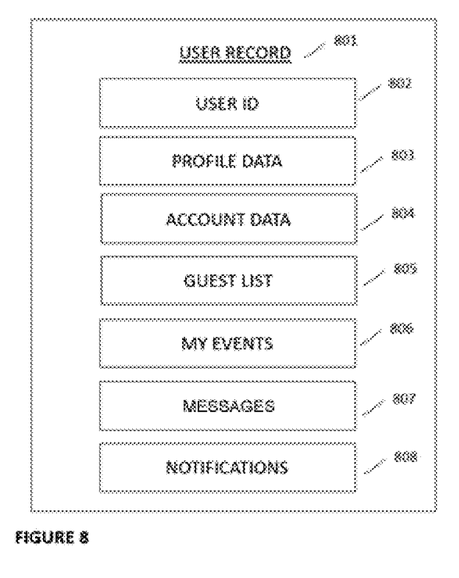
FIG. 8 illustrates an example of the fields in a user record.

FIG. 8 provides an example of what a user record 801 may consist of, including but not limited to a user ID 802, profile data 803 (e.g., name, screen name, bio (e.g., school(s) attended, job information, etc.), age, gender, email, contact number, address, location, personal interests (e.g., hobbies, beliefs, preferred activities, etc.), photo, etc.), account data 804 (e.g., user name, password, etc.), guest list 805 (the list of event participants that the user indicates an interest in), past/current event information 806 (e.g., events the user is currently or has signed up for), messages 807 (e.g., messages between users), and notifications 808 (e.g., notifications sent by the system regarding events, new groups that have been formed, etc.).

Figure 3:
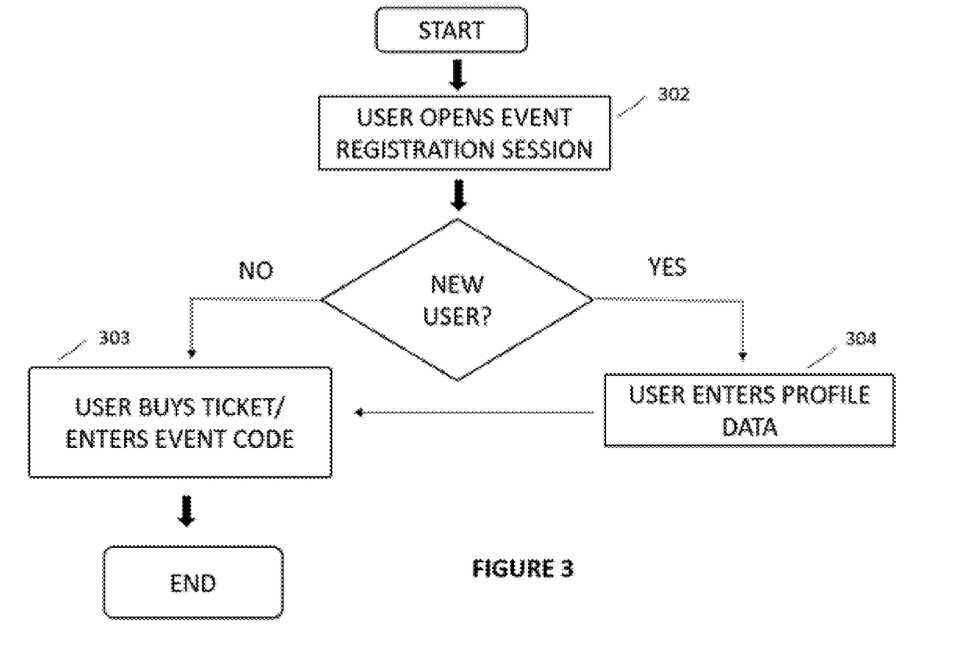
FIG. 3 illustrates the event registration process by a user according to an embodiment.
Figure 5:
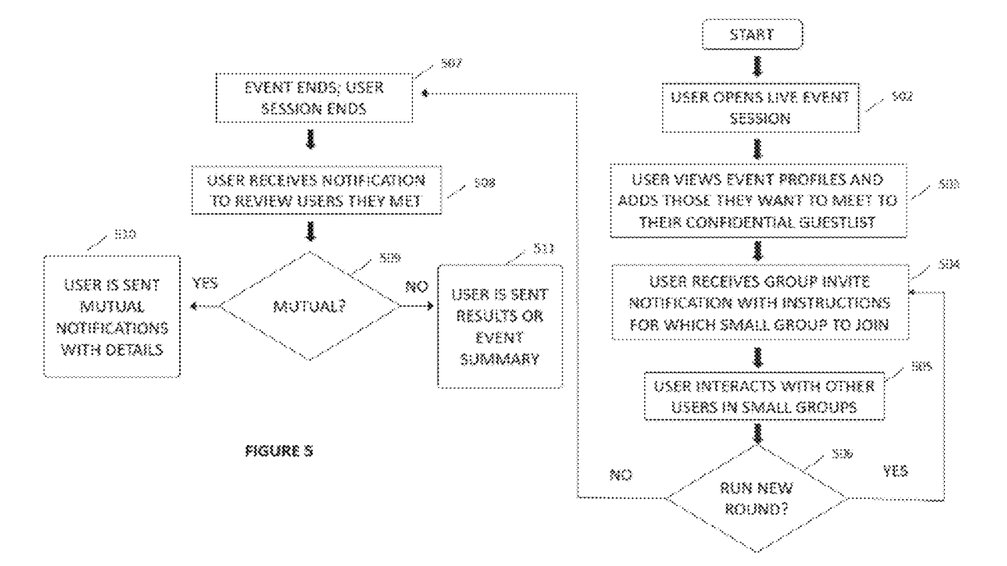
FIG. 5 illustrates the operational flow from a user perspective on the day of the event according to an embodiment.

FIG. 3 and FIG. 5 describe the operation of an embodiment of the present invention from the user's perspective. Other embodiments of the present invention are otherwise indicated as such.

FIG. 3 describes the user event registration process prior to the event. In an embodiment, a single person learns about an upcoming social networking event and opens an event registration session at step 302. If the user has previously registered an account, he can log in and proceed to purchase an event ticket at step 303. If the user is new, he will have to enter his profile data at step 304 before purchasing an event ticket at step 303. In an alternative embodiment, a new user may purchase an event ticket first, then an email (or other form of communication, e.g., SMS, phone call, etc.) confirmation with an event code is sent to the user. The user can then create a profile on the system, and enter the received event code to register for the event.

A simple profile may include name, age, gender, email, location, personal interests, and photo. This information constitutes part of the user's user record 801, which includes at least a user ID 802, profile data 803, and account data 804.

Another embodiment may include event ticket purchase through a third party, wherein the user may receive an event code which the user will enter during event registration step 303.

Once the registration process is complete, the user's profile is stored in the database 106 and is ready for activation on or close to the day of the event.

FIG. 5 describes the live event process from the user's perspective at the start of the event. On or prior to the day of the event that the participant is registered for, the user checks into the event and opens a live event session at step 502. In an embodiment for live events, an admin or other person may also need to verify that the user is present to complete the check-in. This helps resolve the issue of users checking in and reviewing other user profiles without being physically present.

After being checked in to the event, the participant can start to access the functions of the client application, including viewing the profiles of other event participants and adding those of interest to the secret guestlist 805 at step 503. In one embodiment, participants may not be allowed to view profiles and add them to the guestlist until a certain time (set by the admin) has elapsed, e.g., 15 minutes. This delay may help ensure that participants stay at the event, rather than leaving immediately after seeing who else is in attendance at the event.

In one embodiment, participants use a personal device, such as a mobile phone, to select interests during the event. Other embodiments of the present invention may involve the use of other types of devices, such as a centrally-located electronic kiosk or computer, to select interests during the event.

The user then receives a notification (e.g., SMS message, phone call, notification within the app, etc.) from the admin with instructions on which small group to join for smaller group activities at step 504, which allow interactions within groups at step 505. The compositions of small groups are generated by the system based on user data as further described in greater detail below. The numbers of participants in each group may vary depending on the nature of the event and total number of participants at the event. In one embodiment, each small group may contain between 6 to 8 participants. Participants in each group will be anonymously connected to one another based on user-selected interests and other inputs as described with respect to FIG. 6.

The nature of these small-group activities is non-limiting and can include board games, team-building games, competitive activities, sporting activities, dining, mini-speed dating, ice-breaker activities, scavenger hunts, etc. In a business-to-business (B2B) model, a third party vendor may be any service provider who wishes to offer their services through the small group activities. For example, a restaurant business client may offer small-group rotations of a meal course for participants, allowing them to interact during the meal.

At the end of each small group activity, participants may be asked to take a break of a few minutes before another round of small-group activity is carried out at step 506. The duration of events, and the number of rounds of small-group activities per event may differ based on the nature of the small group activity, vendor, day of the week, number of participants and the venue type. For example, a two-hour event may consist of about three rounds of small group activities that are between 20 to 40 minutes long.

If another round of small groups is created, each user receives another notification from the admin with instructions on which small group to join at step 504. If a new round is not organized, the event ends and the user session ends at step 507. In one embodiment, following an elapse of time, participants receive a notification within the app to review users they met at the event, e.g., in the groups, to indicate their interest in sharing their contact information, such as email, with participants whom they are interested in pursuing further contact with at step 508. A user review may comprise a 'like' indication, a numerical rating, and/or written comments. Only the contacts of participants who have indicated mutual interest (based on the user reviews) at step 509 are shared with one another at step 510. Mutual interest may be determined in several ways, including but not limited to users that have given each other a 'like,' users that have given each other high enough respective ratings (e.g., the sum of their respective ratings is above a threshold), etc.

In one embodiment, the app may include a messaging ability that would be enabled between certain users after the event based on the logic/rules set by the admin. One or more parameters may be set (e.g., by the admin) that control which users are allowed to message each other and the amount of time (e.g., for 48 hours after the event) during which messages may be exchanged. For example, only users with mutual interest (based on the user reviews) may be permitted to contact each other.

In an alternative embodiment, all users are allowed to message users of the opposite gender for a predefined amount of time, e.g., 48 hours. In other embodiments, all users may be allowed to message each other regardless of gender for the predefined amount of time.

Users with interests that are not mutual may be notified about the results of the event at step 511.

Figure 2:
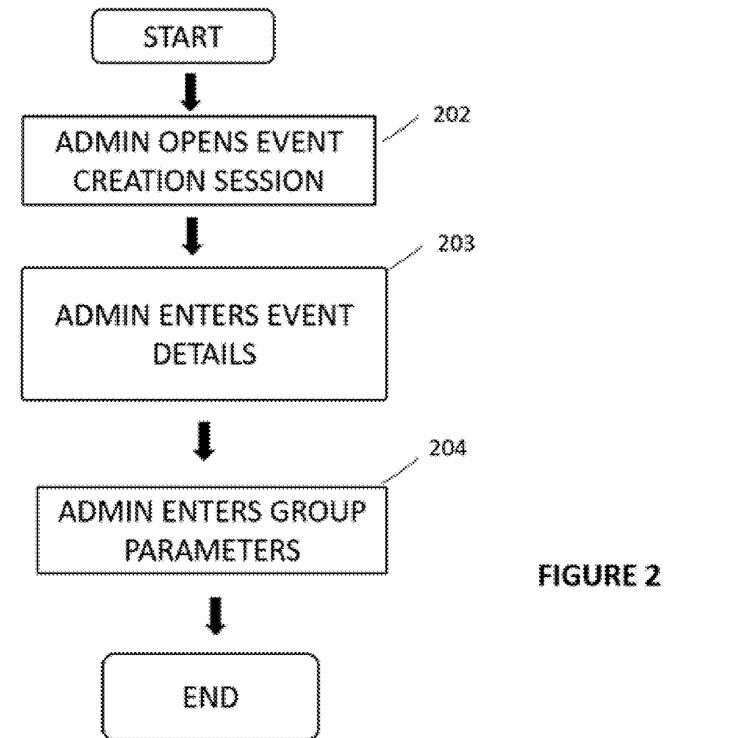
FIG. 2 illustrates the event set-up process by an admin according to an embodiment.
Figure 4:
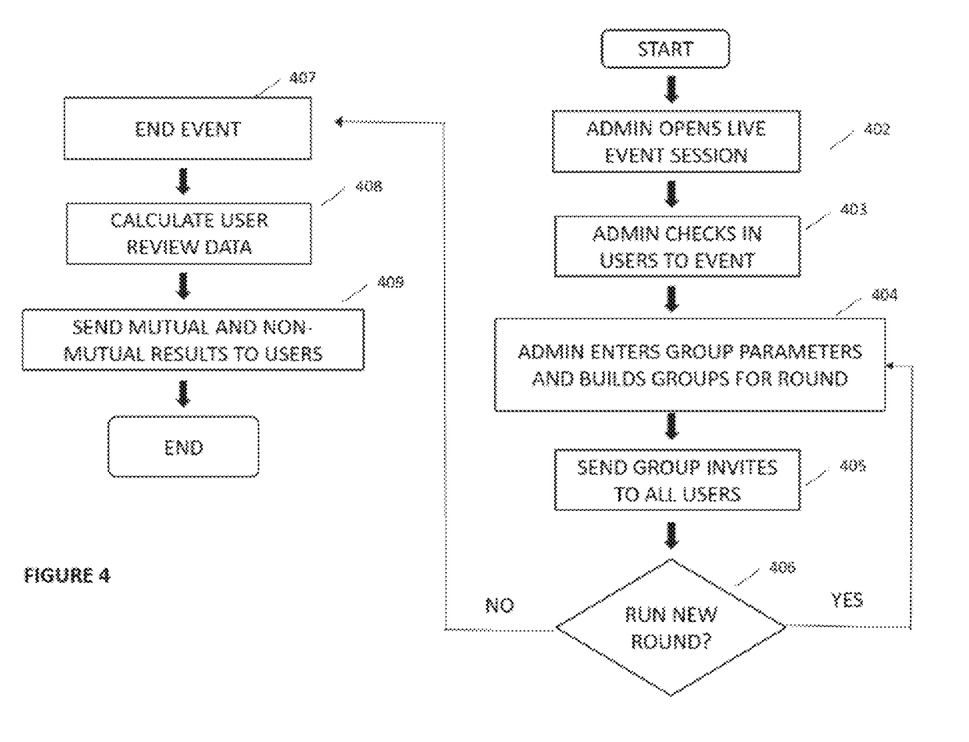
FIG. 4 illustrates the operational flow from an admin perspective for managing the event according to an embodiment.

FIG. 2 and FIG. 4 describe the operation of an embodiment of the present invention from the admin's perspective. Other embodiments of the present invention are otherwise indicated as such.

FIG. 2 describes the event creation process by the admin/host prior to the event. The admin opens a "create event" session at step 202 and enters the event details and data (e.g., event data 703 and group parameters 704) at step 203. Once this is complete, the event record is stored in database 106 and the system generates a unique event ID 702 for the event. The event record is then ready to be used for the live event process as described in FIG. 4 on or close to the day of the event.

FIG. 4 describes the live event process from the admin perspective. This occurs on or prior to the day of the event. The admin opens the live event session at step 402 and authenticates users into the event session through a live check-in method at step 403. An alternative embodiment of the check-in process may be a self-check-in method as described above with respect to step 502 of FIG. 5. The admin may adjust the event group parameters (e.g., number of groups, number of users of each gender in each group) for further event customization. After users have finished adding other users to their guestlists, the admin uses the system functionality to place all users at the event into smaller groups at step 404 as generated using various data and as described with respect to FIG. 6. The admin then activates the send notifications functionality which sends to all users 103 the groups they have been organized into for group activities.

In one embodiment, the admin may modify the composition of the groups before sending the notifications. The admin may be presented with an interface that permits changes to be made to the group compositions. The interface may be configured to show the admin the round score (as described below with respect to FIGS. 9 and 10) before and after the change, so the admin can take the score into account when deciding whether to accept the round. This would allow the admin to use personal knowledge to inform the group compositions.

Following the completion of the first round of group activities, the admin may optionally run a new round, where a new round of groups is built at step 404 and users are once again notified of which groups to join at step 405. If a new round is not organized, the admin ends the event session at step 407. As each round is created, the round information, including the composition of the groups of the round, is stored as event round information 707 in database 106.

With the submission of user reviews of other users at the end of each event, the matching system 101 calculates the user review data at step 408 and sends contact information to users 103 who have indicated mutual interest in one another at step 409. Other embodiments of contact may also include a messaging ability allowed between certain users as specified under the logic rules, as described above with respect to steps 508 through 510 of FIG. 5.

Figure 6:
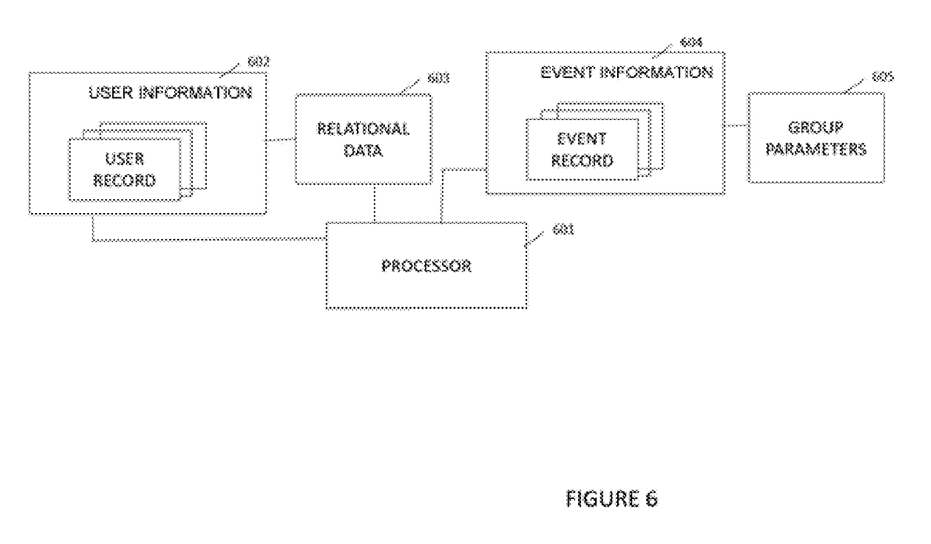
FIG. 6 illustrates one embodiment of the event group generator.

FIG. 6 illustrates an embodiment of the group generator of the present invention. Other embodiments of the present invention that allow users to be connected in groups are possible and would also serve to produce the system of the present invention.

During a live event, the processor 601, e.g., one or more processors of the matching system 101, gathers various data and then generates combinations of groups (called "pre-rounds" herein) for group activities. The gathered data includes:

User information 602, consisting of user records 801 from database 106;
Relational data 603 generated from user-selected guestlists, further described below with respect to FIG. 9 and FIG. 10;
Event information 604, consisting of event records 701 (including records of past events) from database 106;
Group parameters 605, such as total number of event attendees, number of representatives from each gender type, and number of small groups per round;

Some or all of this data is used by the processor 601 to generate a plurality of pre-rounds with varying combinations of groups, each with a respective score. The pre-round with the highest score is selected and sent to the admin to decide if they wish to use it as the round. Alternatively, the pre-round with the highest score may be automatically selected as the next round without further input from the admin.

Figure 11:
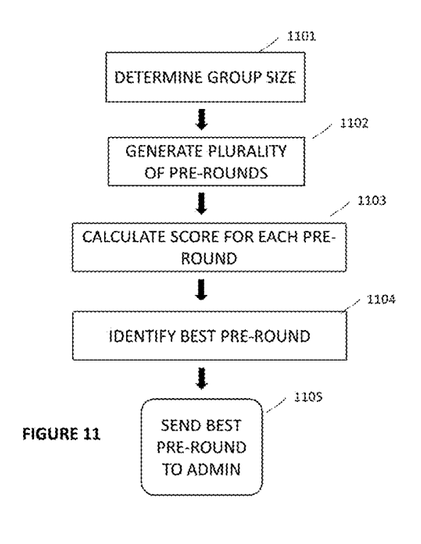
FIG. 11 illustrates an example of a round creation process.

FIG. 11 describes a round generation process according to an embodiment of the invention. In step 1101, the size of the groups is determined. The size may be defined by the admin, or calculated by the processor 601. In one embodiment, the size of the groups is approximately equal to the square root of the number of participants. In some embodiments, each of the groups will be approximately the same size. In some embodiments, the size of the groups may be a range of values, e.g., between 6 and 8 participants.

In step 1102, multiple pre-rounds are generated. Each pre-round will contain the number of participants decided in the prior step. The pre-rounds may be generated in a number of different ways. In one embodiment, all event participants are randomly sorted into groups. In some embodiments, the groups may be gender balanced after creation, e.g., by swapping users. If such swapping is needed, then the pre-round scores of each potential swap will be calculated and the swap(s) that generate the highest score will be selected.

After the pre-rounds are generated and optionally gender balanced, a score is calculated for each pre-round in step 1102. In one embodiment, the pre-round score is calculated by summing the values of the edges of the connection graph of each group in the pre-round and then subtracting the sum of values of the edges of each group that have appeared in prior rounds. Any of the values used in calculating the pre-round score could be scaled by a factor prior to being combined. The scaling factors may be predefined or defined by the admin during the event.

Some embodiments of the scoring method may score certain types of connections at a higher value than other types of connections between users. An example could be scoring mutual interests between participants higher than one-way connections; or scoring participants with common religious beliefs or hobbies higher than those who do not share any common attributes.

These pre-rounds are sorted by their total score value to determine the pre-round with the highest overall score in step 1104. This "best" round is then stored on the matching system 101 and displayed to the admin in step 1105 (also see steps 707 and 708). The admin can decide to use the round or cause the matching system to generate a new round to be used instead. In one embodiment, the best round is automatically used, without input from the admin.

In an alternative embodiment, the groups in each round may be determined using a variation of the highly connected subgraphs (HCS) clustering algorithm, which divides a graph into subgraphs using minimum cuts. For the purpose of a live singles event, the minimum cuts would need to take into account the gender of the participants and that the groups should be approximately the same size.

Figure 12:
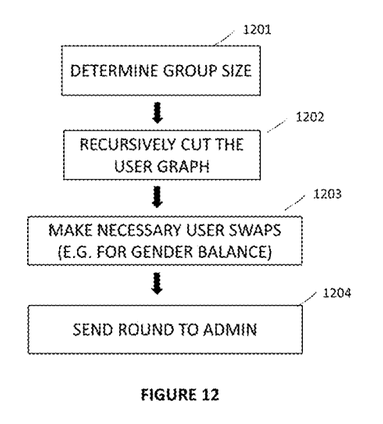
FIG. 12 illustrates an alternative example of a round creation process.

FIG. 12 describes a round generation process according to an embodiment of the invention. In step 1201, the size of the groups is determined. The size may be defined by the admin, or calculated by the processor 601. In one embodiment, the size of the groups is approximately equal to the square root of the number of participants. In some embodiments, each of the groups will be approximately the same size. In some embodiments, the size of the groups may be a range of values, e.g., between 6 and 8 participants. The number of groups is also determined, which is based on the group size, e.g., total number of participants divided by the group size.

In step 1202, minimum cuts are applied to the graph recursively until the number of groups determined in the prior step are created. The calculation of each minimum cut takes into account the group size and gender balance. The calculation of the minimum cut also uses a group score calculation as described above with respect to step 1102.

In step 1203, the groups created in the prior step are evaluated for gender balance, and if necessary, swaps are made between groups to improve the gender balance. In step 1204, the round is displayed to the admin, and the admin can decide to use the round or calculate a new round to be used instead. In one embodiment, round is automatically used, without input from the admin.

In one embodiment, the system may select from several different group creation methods (e.g., round generation processes described in FIGS. 11 and 12), based in part on group parameters 704.

Once the admin chooses to use a round he activates the notification functionality which sends to all users 103 the group name and instructions they have been organized into where they can proceed to meet their connections and participate in group activities with them.

Figure 9:
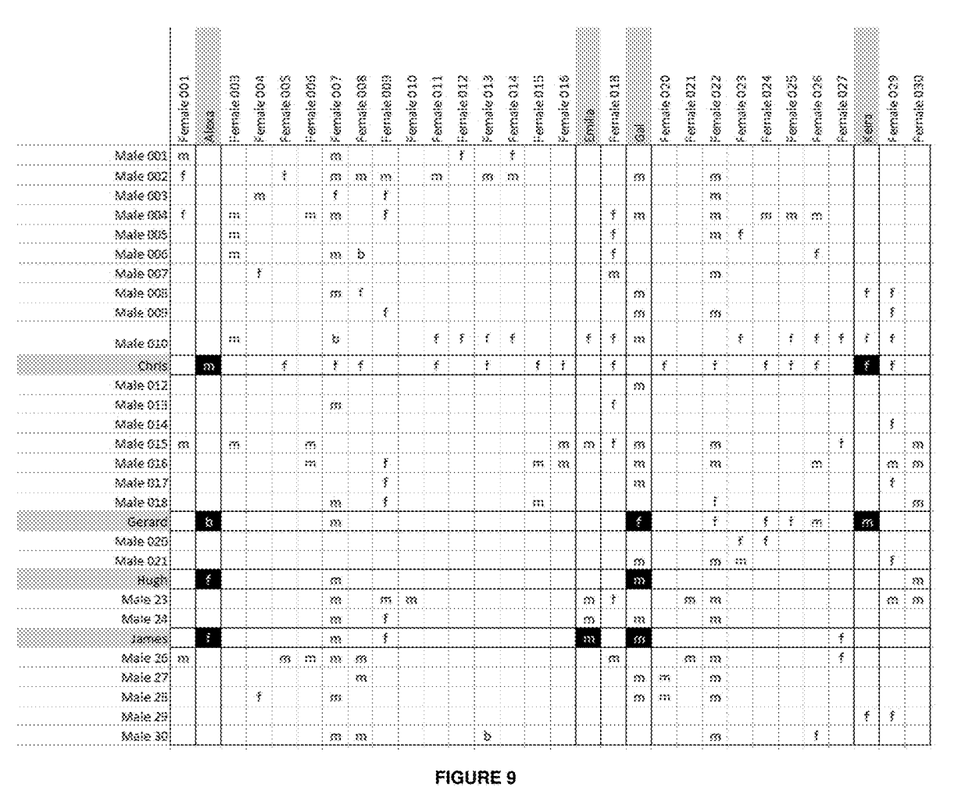
FIG. 9 illustrates an example of users and their secret guestlists at an event.
Figure 10:
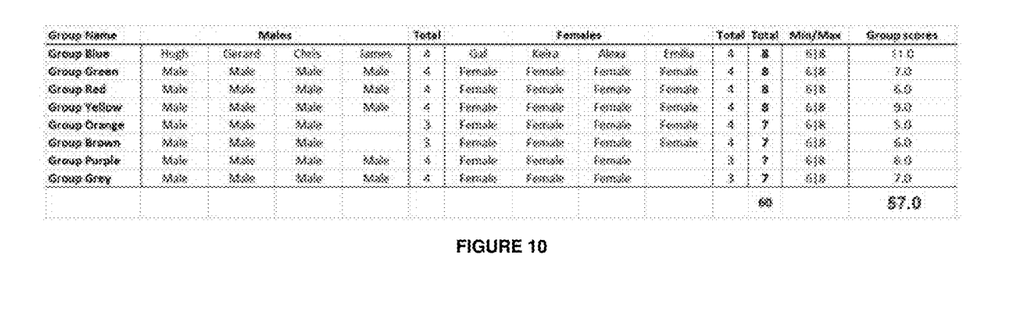
FIG. 10 illustrates an example of a round created by the event group generator.

FIG. 9 illustrates an example embodiment of data that may be used to generate the best combinations of connected groups for group activities as shown in FIG. 10.

FIG. 9 shows an example of user guestlists compiled together as relational data 603 of 30 male and 30 female users at an event. Each unique male participant is named "Male001", "Male002", "Male003", etc. For illustrative purposes, four males are named "Chris", "Gerard", "Hugh" and "James". Each unique female participant is named "Female001", "Female003", "Female004", etc. For illustrative purposes, four females are named "Alexa", "Emilia", "Gal" and "Keira".

The letter "m" is used to denote a connection where a male participant has added the corresponding female participant to his secret guestlist. The letter "f" is used to denote a connection where a female participant has added the corresponding male participant to her secret guestlist. The letter "b" is used to denote a connection where the male and female participants have mutually added each other to their secret guestlists.

In FIG. 9, the connections shown as an example are as follows:
Chris has Alexa on his guestlist (one-way interest), and is on Keira's guestlist (one-way interest).

Gerard has Alexa (mutual interest since Alexa also has Gerard on her guestlist) and Keira on his guestlist (one-way interest), and is on Gal's guestlist (one-way interest);

Hugh has Gal on his guestlist (one-way interest), and is on Alexa's guestlist (one-way interest);

James has Emilia and Gal on his guestlist (one-way interests), and is on Alexa's guestlist (one-way interest);

Alexa has Gerard (mutual interest), Hugh and James on her guestlist (one-way interests); and is on Chris' and Gerard's guestlist (one-way interest);

Emilia does not have anyone on her guestlist, and is on James' guestlist (one-way interest).

Gal has Gerard on her guestlist (one-way interest); and is on Hugh's and James' guestlist (one-way interest);

Keira has Chris on her guestlist (one-way interest); and is on Gerard's guestlist (one-way interest).

FIG. 10 shows an example of a round selected by the system as the best pre-round, where the pre-rounds were scored based on the relational data as shown in FIG. 9. In the FIG. 10 example, each group has been scored based on connection values between participants. The group (Group Blue) which includes users Hugh, Gerard, Chris, James, Gal, Keira, Alexa, and Emilia has been given a group connection score of 11.0. This score was calculated by counting all of the connections between those users, with the 'b' connection between Gerard and Alexa multiplied by a scaling factor of 2.0 as the connection is both ways (i.e., both Gerard and Alexa included each other on their secret guestlist). Common attributes, e.g., commonly-liked activities or hobbies, commonly-held beliefs, etc., may also be included in the calculation of the group scores. For example, each shared attribute between two users may be counted as a connection between the two users. Each type of connection (e.g., one-way interest, two-way interest, attributes), may be multiplied by a scaling factor during the group score calculation. In some embodiments, the connections between the users may be weighted based on a level of interest specified (e.g., a numerical value (e.g., between 0 and 5, 1 and 10, etc.) indicating the level of interest) by the user when adding other users to the secret guestlist or when selecting user attributes.

The other groups are also scored in a similar manner and then all group scores are combined together to generate the total pre-round score of 57.0. This was determined by the system as the best pre-round and sent to the admin to be considered for use. Other embodiments of the scoring rules used by the matching system 101 may also be adjusted and optimized to form stronger connections among users at an event.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method for the confidential electronic live matching and grouping of users physically present at a live event based on user-selected information, the method comprising the steps of:

(a) during said live event, event administrator:

creating a new event in the system via event administrator functions, wherein the event administrator inputs event details including the event name, date, time, and location into the system;

receiving personal profile information from users physically present at said live event, wherein users input personal profile information into the system, including first name, age, gender, photos and hobbies;

activating said personal profiles of users in the system as they physically arrive at said event, wherein the system verifies the physical presence of the users at the event using location data from the users' personal electronic devices and activates the users' personal profiles in the system allowing activated personal profiles to be available for viewing by all users physically present at said event;

setting group parameter information, wherein the event administrator sets parameters for grouping users, the parameters including total number of users physically present at said event, number of male and female users physically present at said event, number of groups to generate so that each group consists of approximately the same number of users, with equal or close to equal number of male and female users in each group, and number of times to run live matching algorithm to generate groups for social interaction during said event;

receiving from each user physically present at the event a list of secret interests wherein the secret interests are comprised of users of the opposite gender that the user submitting the list is secretly interested in meeting;

confidentially matching and grouping users based on the group parameter information and the users' secret interests, wherein the system applies a matching algorithm to the users' secret interests and the group parameter information to form groups of users;

sending a notification to each user's personal electronic device about each group assignment as a result of live matching;

throughout said live event, allowing each user to update said list of secret interests;

repeating said live matching of users for subsequent rounds of social interactions, each time generating a new group of users based on each user's updated set of said secret interests;

(b) after conclusion of said live event, the method further comprising the step of the event administrator:

opening a chat functionality within the system, enabling users to continue to interact with all other users who were present at the event.

2. The method of claim 1, wherein the event administrator activating user personal profile information at said live event, setting group parameter information for live matching users at said live event, receiving secret interest information from users at said live event, generating said groups of users based on live matching at said live event, and sending notifications of group assignments at said live event, are accomplished using a computer program product encoded on one or more non-transitory computer storage media, comprising instructions to perform said live matching algorithm based on each user's secret interests.

3. The method of claim 2 further comprising applying a weighted minimum-cut algorithm consisting of instructions that when executed by one or more processing means cause the one or more processing means to perform said live matching algorithm comprising:

gathering various data inputs, including group parameter information; This information includes the total number of users physically present at said event, number of male and female users physically present at said event, number of groups to generate so that each group consists of approximately the same number of users, setting minimum and maximum parameters of number of users of each gender type per group for the purpose of ensuring equal or close to equal number of male and female users per group, and number of times to run live matching algorithm to generate groups for social interaction during said event), each user's personal profile information, and each user's list of secret interests;

processing said data inputs using an algorithm that assigns a numerical score for the relative strength of each type of connection found between each user with every other user physically present at said live event based on each user's list of secret interests, including whether there is mutual interest between users of opposite gender, the number of users from each user's secret interests that the user has not yet been assigned in the same group with, and the number of times a user has been assigned in the same group with another user;

sending information regarding the combination for grouping of users with the highest assigned numerical score value to an admin device for display to be considered by event administrator for grouping users;

notifying users of their group assignments on said software application in each user's personal electronic device.

4. The method of claim 1, wherein user input of personal profile information, viewing of user profiles of all users physically present at said live event, input of information regarding user's list of secret interests, updating of said list of secret interests, and receiving notification of user's group assignments, are accomplished using a software application downloaded in each user's personal electronic device.

5. The method of claim 4, wherein user input of information regarding a user's list of secret interests into said software application downloaded in each user's personal electronic device comprises:

viewing the personal profile information of all users of the opposite gender physically present at said live event;

indicating the users they are interested to socialize with by adding them to their list of secret interests, without the knowledge of users in their list; and receiving notifications during said live event of their assigned groups resulting from live matching for social interactions.

* * * * *